United States Patent
Theofanopoulos et al.

(10) Patent No.: US 6,437,460 B1
(45) Date of Patent: Aug. 20, 2002

(54) LOW POWER SUPERVISOR CONTROLLER

(75) Inventors: John Theofanopoulos, Pontiac; John J. C. Kopera, Ortonville; Erik J. Hansen, Oxford; Frank Vettraino, Jr., Warren, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/417,793

(22) Filed: Oct. 27, 1999

(51) Int. Cl.$^7$ ................................................. H02G 3/00
(52) U.S. Cl. ........................................ 307/10.1; 701/36
(58) Field of Search ............................... 307/10.1, 112, 307/116, 125; 713/300, 320, 324, 501, 502; 701/29, 31, 33, 36

(56) References Cited

U.S. PATENT DOCUMENTS

| | | | | |
|---|---|---|---|---|
| 4,455,623 A | * | 6/1984 | Wesemeyer et al. | 713/320 |
| 4,839,530 A | * | 6/1989 | Greenwood | 307/10.1 |
| 4,965,550 A | * | 10/1990 | Wroblewski | 307/10.1 |
| 5,081,586 A | * | 1/1992 | Barthel et al. | 307/10.1 |
| 5,485,625 A | * | 1/1996 | Gumkowski | 713/323 |
| 5,568,052 A | | 10/1996 | Sway-Tin et al. | |
| 5,621,250 A | * | 4/1997 | Kim | 307/10.1 |
| 5,717,310 A | * | 2/1998 | Sakai et al. | 307/10.1 |
| 5,800,025 A | | 9/1998 | McGrath et al. | |
| 5,834,854 A | | 11/1998 | Williams | |
| 5,939,998 A | * | 8/1999 | Caporuscio et al. | 713/300 |
| 5,945,745 A | * | 8/1999 | Macks | 307/10.1 |
| 5,952,813 A | * | 9/1999 | Ochiai | 320/104 |
| 5,999,876 A | * | 12/1999 | Irons et al. | 701/115 |
| 6,084,315 A | * | 7/2000 | Schmitt | 307/10.1 |
| 6,198,995 B1 | * | 3/2001 | Settles et al. | 713/320 |
| 6,219,217 B1 | * | 4/2001 | Obermaier et al. | 361/115 |

* cited by examiner

Primary Examiner—Brian Sircus
Assistant Examiner—Roberto J. Rios
(74) Attorney, Agent, or Firm—Edwin W. Bacon, Jr.

(57) ABSTRACT

A low power supervisor controller for an electric vehicle substantially reduces ignition-off draw current in the main control module. The supervisor controller has a sleep controller for powering down the main control module when an interrupt event has not occurred. The sleep controller powers up the main control module when the interrupt event has occurred. The supervisor controller also has an interrupt monitor for determining when the interrupt event occurs, as well as a supervisor wait module. The supervisor wait module establishes and controls an interrupt cycle, wherein the interrupt cycle is defined by an amount of time between determinations of the interrupt monitor.

8 Claims, 3 Drawing Sheets

LOW POWER SUPERVISOR CONTROLLER

FIELD OF THE INVENTION

The present invention relates generally to electric vehicles. More particularly, the present invention relates to the reduction of ignition-off draw current in electric vehicle main control modules.

BACKGROUND OF THE INVENTION

Electric vehicle technology is under rapid development. The main focus of electric vehicle developmental programs is to produce cars that are competitive with present-day internal combustion engine vehicles. A significant motivation for using electronic vehicles is the current trend towards reducing emissions. Air pollution produced by internal combustion engine vehicles (ICEV's) in large cities have reached significant levels. These levels can be dramatically decreased by active reduction of emissions from internal combustion engines. Studies have shown that considering only vehicle and power plant pollution, a significant switch to electric vehicles would practically eliminate carbon monoxide, ozone, and volatile organic compounds from the air. Thus, electric vehicles have a substantial relationship to the overall well being of today's society as well as the viability of future generations.

For the electric vehicle to become a realistic option for transportation, the primary technological issue which must be improved upon is energy storage and use. Short range and long range charging times have daunted electric vehicle design efforts since the early 1990's. A significant hindrance in this development has been related to ignition-off draw currents in electric vehicle control systems. Ignition-off draw currents are currents which are present when the vehicle ignition is in the "off" position. These currents place a substantial draw on auxiliary power which is an important component of electric vehicle energy storage systems. The main control module, which is responsible for monitoring and controlling major systems within the vehicle, is largely responsible for ignition-off draw (IOD) currents.

Specifically, a major reason for the IOD current phenomenon is the perceived need to continuously power the main control module (MCM) for monitoring activities even when the ignition is off. These activities include the performance of predetermined calculations and the detection of certain events. When the ignition is on, quantities like temperature, speed, current, and voltage are all relevant to sub-system operation. These quantities are measured with transducers that convert operating conditions into analog signals. The signals are then digitized and supplied to the MCM, which evaluates the sub-system signals and sends out various control signals. When the ignition is off, the MCM must also monitor the batteries, perform calculations on state-of-charge, and turn on the heaters to maintain battery temperature if required. The problem with present approaches is that they fail to realize that these calculations and functions do not have to continuously be made. Thus, while it is true that the MCM must occasionally be powered on, continuous operation is excessive and wasteful of resources. In other words, continuously powering the MCM when the ignition is in the off position results in unnecessarily high IOD currents.

More recent approaches have involved placing the MCM in a low-power mode. This approach, however, still requires the application of power to certain portions of the MCM and therefore fails to fully address the issue of IOD current. As already noted, high IOD currents deplete the auxiliary power which supplies such crucial functions as turning on the vehicle, power steering, power brake operation, headlight operation, and turn indicator control.

SUMMARY OF THE INVENTION

The present invention provides an electric vehicle low power supervisor controller for reducing ignition-off draw current in main control modules. The controller has a sleep controller for powering down the main control module until an interrupt event occurs. Interrupt events include activities such as placing the vehicle in charging mode and turning on the ignition. The sleep controller powers up the main control module when the interrupt event occurs. The supervisor controller also includes an interrupt monitor for determining when the interrupt event has occurred. A supervisor wait module establishes and controls an interrupt cycle, wherein the interrupt cycle is defined by an amount of time between determinations of the interrupt monitor. The supervisor wait module therefore places the main control module in a sleep mode during the interrupt cycle.

The present invention also provides a method for reducing ignition-off draw current in an electric vehicle with a low power supervisor controller. The method includes the steps of powering down a main control module until an interrupt event occurs, and determining when the interrupt event occurs. The method further includes the step of powering up the main control module when the interrupt event occurs. As an additional aspect, the method provides the step of placing the supervisor controller in a sleep mode when interrupt event determinations are not being made.

Further objects, features and advantages of the invention will become apparent from a consideration of the following description and the appended claims when taken in connection with the accompanying drawings.

BRIEF DESCRIPTION OF THE DRAWINGS

The invention is set forth in exemplary fashion by the following detailed description of a preferred embodiment taken in conjunction with the drawings, in which.

DETAILED DESCRIPTION OF THE PREFERRED EMBODIMENT

Figure 1:
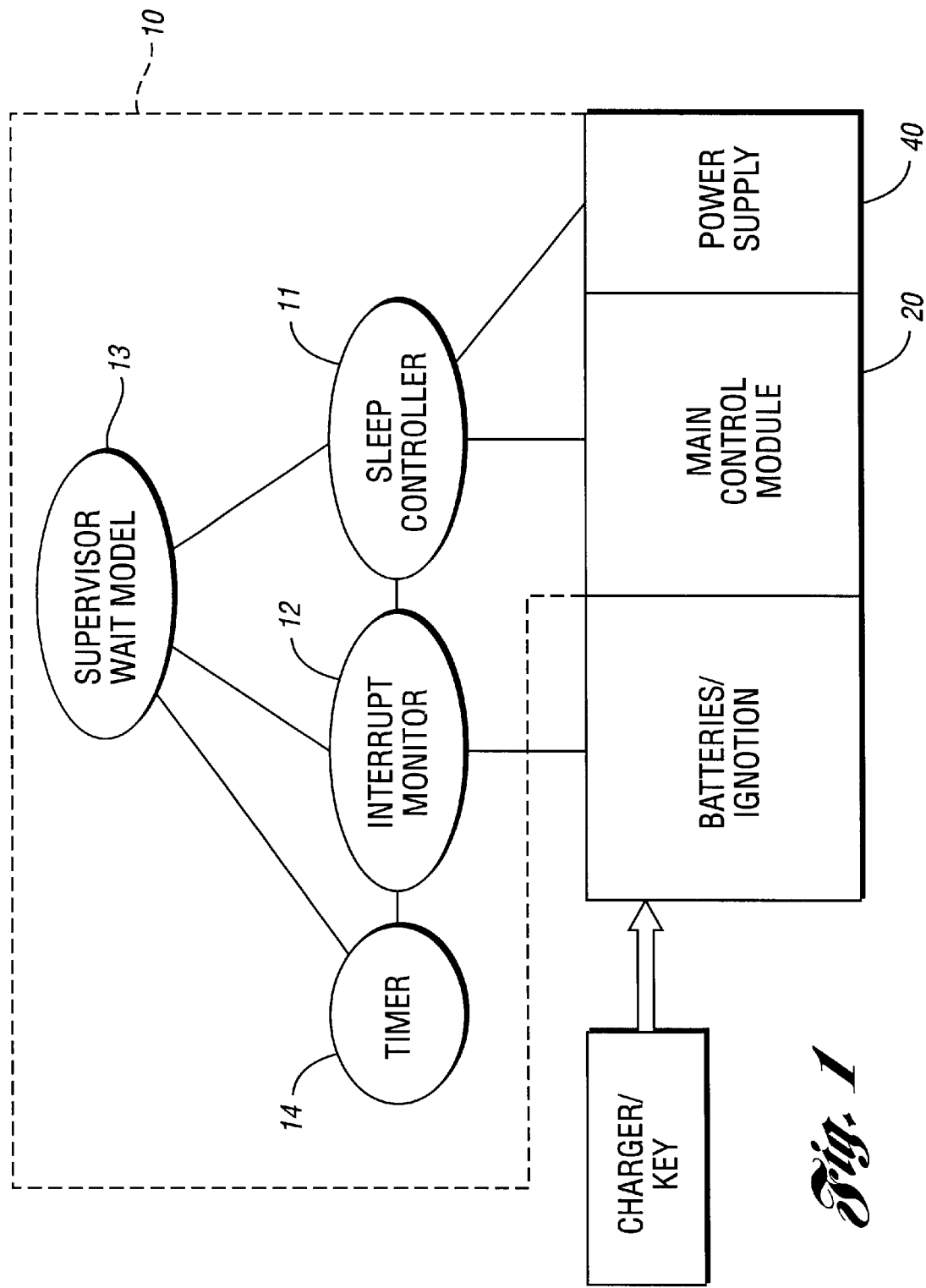
FIG. 1 is a simplified block diagram representing an electric vehicle employing a supervisor controller in accordance with the present invention.

The present invention directed toward an electric vehicle low power supervisor controller is shown in FIG. 1 at 10. The supervisor controller 10 includes a sleep controller 11, an interrupt monitor 12, and a supervisor wait module 13. The preferred embodiment further includes a timer variable 14. These components can be readily implemented as programming code using techniques well-known in the art. The supervisor controller 10 provides for the efficient reduction of ignition-off draw current in electric vehicle main control modules.

Generally, the sleep controller 11 powers down the main control module 20 until an interrupt event occurs. Keeping the main control module 20 in a powered down state until needed substantially reduces the ignition-off draw current. The interrupt monitor 12 determines when an interrupt event has occurred by monitoring various conditions within the vehicle 30. Interrupt events occur under a number of different circumstances such as turning the ignition to the "on" position, plugging the vehicle 30 up to a charger, and the expiration of a predetermined amount of time. The predetermined amount of time defines the amount of time between periodic wakeups of main control module 20. In the preferred embodiment this amount of time is one hour. Periodic wakeups are necessary to ensure that the batteries and other sub-systems are operating properly.

The supervisor wait module 13 controls the amount of time between checks for an interrupt event. The preferred embodiment defines this interrupt cycle to be 250 ms. The interrupt cycle is thus effectively defined by the amount of time between determinations of the interrupt monitor 12.

It will be appreciated that certain interrupt events will trigger an instantaneous powering up of the main control module 20, whereas others will not. For example, when the interrupt event represents the electric vehicle 30 being placed in a charging mode, the interrupt monitor 12 prevents the sleep controller 11 from powering up the main control module 20 until the expiration of the predetermined amount of time. Essentially, the interrupt monitor 12 uses the timer variable 14 to wait until the next scheduled periodic wakeup before letting the sleep controller 11 power-up main control module 20. This feature ensures that the charger will be allowed to charge the vehicle batteries in the ignition off state without the additional current draw of the main control module 20.

On the other hand, when the interrupt event represents the expiration of the predetermined amount of time, the supervisor controller 10 places the main control module 20 in a periodic wakeup so that certain calculations may be performed. In the present example, the sleep controller 11 powers up the main control module 20 via power supply 40, issues a periodic wakeup to the main control module 20, and the main control module 20 performs predetermined calculations upon receiving the periodic wakeup. Predetermined calculations include but are not limited to calculating charge status and battery temperature. The main control module 20 issues a power down notification to the sleep controller 11 upon completion of the predetermined calculations and the sleep controller 11 powers down the main control module 20 upon receiving the power down notification.

Figure 3:
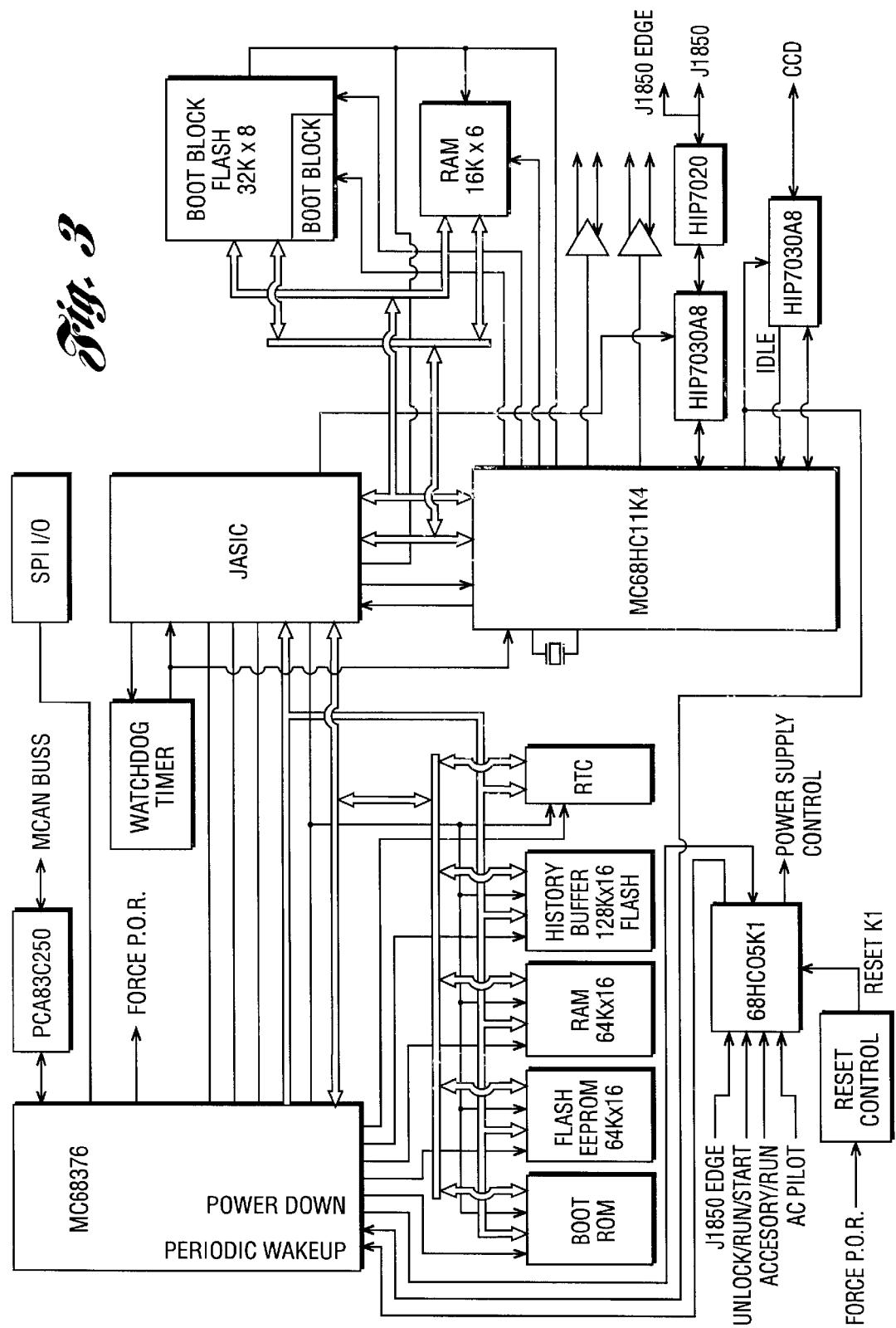
FIG. 3 is an electrical schematic of a main control module implementing a supervisor controller in accordance with the present invention.

Similarly, when interrupt monitor 12 determines that the interrupt event represents the ignition of the vehicle 30 being turned on, the sleep controller 11 powers up the main control module 20. An electrical schematic representation of this system is shown in FIG. 3. The preferred embodiment uses a Motorola 68HC05K1 programmable processor to implement the functions of supervisor controller 10.

Figure 2:
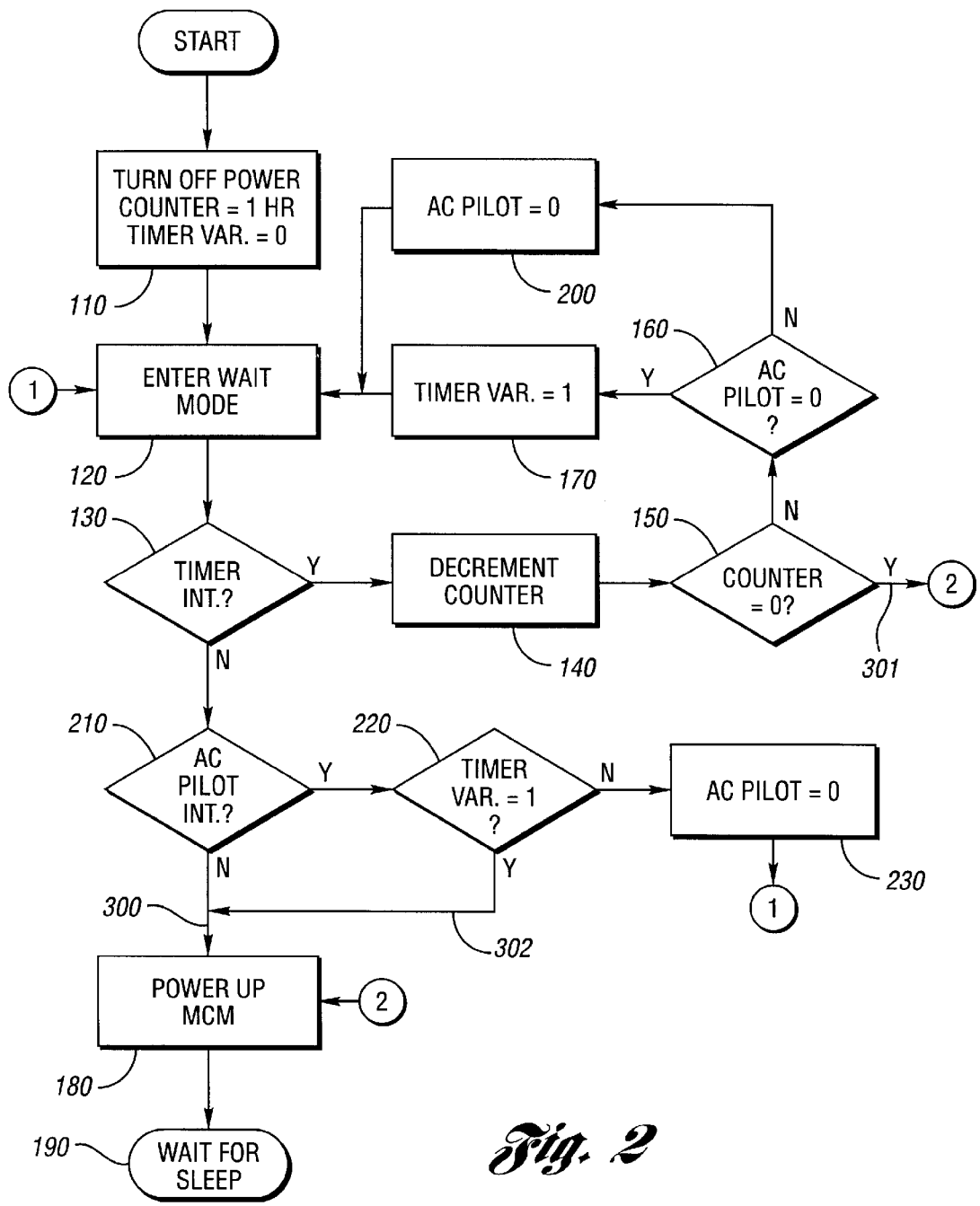
FIG. 2 is a flow chart of a method for reducing ignition-off draw current in accordance with the present invention.

Turning now to FIG. 2, the sequence of operations can better be understood for programming purposes. Generally, the supervisor controller powers-down the MCM at step 110 and powers-up the MCM at step 180 upon the occurrence of an interrupt event. By powering down the main control module at step 110, the present invention reduces the ignition-off draw current by a factor of thirty. For example, IOD currents that were previously in excess of 90 mA have been reduced to about 3 mA. Specifically, a counter is maintained to keep track of the predetermined amount of time which is defined to be one hour, and a Boolean timer variable is set to zero at step 110. The timer variable will be described in greater detail below. After powering down the main control module, the supervisor wait module enters a wait mode at step 120. The preferred embodiment defines three interrupt events: 1) turning the ignition on; 2) expiration of the predetermined amount of time; and 3) plugging in the battery charger. It will be appreciated that points 300, 301, and 302 represent the decisions to power-up due to turning the ignition on, expiration of the predetermined amount of time, and plugging in the battery charger, respectively.

The interrupt event of turning on the ignition and the logic path leading to point 300 will now be discussed in greater detail. The wait mode continues until either the ignition is turned on, the charger is plugged in, or the 250 ms interrupt cycle expires. If the ignition is turned on, the wait mode will be terminated before the expiration of the 250 ms interrupt cycle. Therefore, at step 130 the interrupt monitor will make the determination that the timer did not cause the interrupt and proceed to step 210. At step 210 it will be determined that the charger did not cause the interrupt by checking the value of the AC pilot pin on the supervisor controller. The AC pilot pin receives a 1 kHz AC pilot signal whenever the charger is plugged in. The AC pilot pin actually registers an incremental value which is positive-edge-triggered by the AC pilot signal. Thus, the value at the AC pilot pin is either zero, when the charger is not plugged in, or a rapidly increasing number, when the charger is plugged in. Since the ignition being turned on was the reason for exiting the wait mode, the AC pilot pin value is zero and the interrupt monitor will signal the sleep controller to power-up the MCM at step 180. The interrupt monitor will then wait for a sleep notification at step 190.

The interrupt event of the expiration of the predetermined amount of time and the logic leading to point 301 will now be discussed in greater detail. Returning to step 120, it will be appreciated that the wait mode continues until the expiration of the 250 ms interrupt cycle. In such case, the interrupt monitor will determine that the wait mode was terminated due to expiration of the interrupt cycle at step 130. At step 140, the counter will be decremented and at step 150, a check will be performed to determine whether the counter has expired. Since the one hour predetermined amount of time was the reason for exiting the wait mode, the sleep controller will issue a periodic wakeup to the MCM and power-up the MCM at step 180 for the performance of predetermined calculations. Upon completion of the predetermined calculations, the MCM will issue a power-down notification to the sleep controller, and the sleep controller will power-down the MCM upon receiving the notification. Predetermined calculations include but are not limited to calculating charge status and battery temperature. It is important to note that the interrupt cycle of 250 ms provides the counter with an appropriate baseline when counting down to the next periodic wakeup. Thus, a wakeup period of one hour would result in 14,400 interrupt cycles per period between wakeups. The counter would therefore count down from 14,400 between periodic wakeups.

The interrupt event of plugging in of the charger and the logic leading to point 302 will now be discussed in greater detail. As already discussed, in the present example the interrupt monitor prevents the sleep controller from powering-up the MCM until the predetermined amount of time expires. This prevention is achieved by requiring the timer variable to be set to a value of one before reaching step 180. It can be seen at step 170 that at least one interrupt cycle must expire before the timer variable will be set to a value of one. Thus, at step 120 the wait mode continues until expiration of the 250 ms interrupt cycle. In such case, the interrupt monitor will determine that the wait mode was terminated due to expiration of the interrupt cycle at step 130. At step 140, the counter will be decremented and at step 150, a check will be performed to determine whether the counter has expired. Since the reason for exiting the wait mode was the timer, the supervisor controller will proceed to step 160. Step 160 essentially illustrates a determination of whether the charger has been plugged in. If the charger has not been plugged in, the timer variable will be set to one at step 170 and the supervisor wait module will re-enter the wait mode at step 120. It will be noted that if the charger is determined to have been plugged in at step 160, the AC pilot pin will be set back to zero at step 200 and the timer variable will not be set to one. This is done in order to prevent the sleep controller from responding to the charger until at least one interrupt cycle expires.

Upon setting the timer variable to a value of one, the supervisor wait module reenters the wait mode at step 120. If the charger is plugged in during the 250 ms interrupt cycle, the AC pilot signal will appear and execution of step 130 will result in a determination that the wait mode was not exited due to expiration of the interrupt cycle. Thus, at step 210 the interrupt monitor will determine that the AC pilot pin does not have a value of zero and therefore that the interrupt was caused by the charger. The interrupt monitor then checks for a timer variable value of one at step 220. Since at least one interrupt cycle previously expired, point 302 will be reached and the sleep controller will power-up the MCM at step 180. If the timer variable does not have a value of one at step 220, the AC pilot pin will be set to zero at step 230 and the supervisor wait module will re-enter the wait mode at step 120.

It is to be understood that the invention is not limited to the exact construction illustrated and described above, but that various changes and modifications may be made without departing from the spirit and scope of the invention as defined in the following claims.

What is claimed is:

1. A method for reducing ignition-off draw current in an electric vehicle comprising the steps of:

powering down a main control module until an interrupt event occurs;

determining when said interrupt event occurs;

upon occurrence of said interrupt determining whether said interrupt is of a first type or of a second type; and instantly powering up said main control module when said interrupt is of said first type or, when said interrupt is of said second type, waiting until a predetermined amount of time has expired before powering up said main control module.

2. The method of claim 1 further comprising the step of placing a supervisor controller in a sleep mode when said interrupt event determinations are not being made, the supervisor controller performing the powering down, determining, and powering up steps.

3. The method of claim 2 wherein said interrupt event of said second type includes said electric vehicle being placed in a charging mode, said charging mode representing a process of charging batteries of said electric vehicle.

4. The method of claim 2 wherein said interrupt event of said first type includes a predetermined amount of time expiring.

5. The method of claim 4 further comprising the step of:

said main control module performing predetermined calculations upon completion of said powering up step.

6. The method of claim 5 further comprising the steps of:

issuing a power down notification upon completion of said predetermined calculations; and powering down said main control module upon receiving said notification.

7. The method of claim 5 wherein said predetermined calculations include calculating charge status and battery temperature.

8. The method of claim 2 wherein said interrupt event of said first type includes an ignition of said electric vehicle being turned on.

\* \* \* \* \*